United States Patent
Bugli et al.

(10) Patent No.: US 7,041,146 B2
(45) Date of Patent: May 9, 2006

(54) PRE-FILTERS FOR ENGINE AIR CLEANING SYSTEMS

(75) Inventors: Neville Jimmy Bugli, Novi, MI (US); Gregory Scott Green, Dearborn, MI (US); Jeffry Marvin Leffel, Wixom, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 252 days.

(21) Appl. No.: 10/659,779

(22) Filed: Sep. 10, 2003

(65) Prior Publication Data

US 2005/0050868 A1    Mar. 10, 2005

(51) Int. Cl.
*B01D 46/10* (2006.01)
*B01D 50/00* (2006.01)

(52) U.S. Cl. .................. 55/481; 55/385.3; 55/478; 55/482; 55/495; 55/500; 55/503; 55/506; 55/522; 55/528; 123/198 E

(58) Field of Classification Search ............. 55/385.3, 55/478, 481, 482, 495, 497, 500, 503, 506, 55/DIG. 28, 522, 527, 528; 123/198 E
See application file for complete search history.

(56) References Cited

U.S. PATENT DOCUMENTS

| | | | |
|---|---|---|---|
| 3,766,629 A | | 10/1973 | Lechtenberg |
| 4,070,519 A | * | 1/1978 | Lefkowitz et al. ............ 55/528 |
| 4,265,647 A | * | 5/1981 | Donachiue ................. 55/385.3 |
| 4,704,143 A | * | 11/1987 | Percy .......................... 55/482 |
| 4,758,460 A | | 7/1988 | Spicer et al. |
| 4,925,468 A | * | 5/1990 | Kishi et al. ................... 55/481 |
| 5,000,768 A | | 3/1991 | Hwang |
| 5,030,264 A | | 7/1991 | Klotz et al. |
| 5,125,941 A | | 6/1992 | Ernst et al. |
| 5,368,621 A | * | 11/1994 | Pool .......................... 55/385.3 |
| 5,400,753 A | * | 3/1995 | Andress et al. ............ 55/385.3 |
| 5,438,965 A | * | 8/1995 | Aronsson et al. ............. 55/482 |
| 5,494,497 A | * | 2/1996 | Lee .............................. 55/481 |
| 5,740,774 A | | 4/1998 | Kennedy |
| 5,795,361 A | | 8/1998 | Lanier, Jr. et al. |
| 5,871,001 A | * | 2/1999 | Pelkey ..................... 123/198 E |
| 6,015,452 A | * | 1/2000 | Nepsund et al. .............. 95/287 |
| 6,136,057 A | * | 10/2000 | Dang et al. ................ 55/385.3 |
| 6,159,258 A | | 12/2000 | Ager et al. |
| 6,217,627 B1 | * | 4/2001 | Vyskocil et al. ......... 123/198 E |
| 6,355,077 B1 | * | 3/2002 | Chittenden et al. ........ 55/385.3 |
| 6,451,080 B1 | * | 9/2002 | Rocklitz et al. .............. 55/404 |
| 6,565,620 B1 | * | 5/2003 | Greeson .................... 55/385.3 |
| 6,579,337 B1 | * | 6/2003 | Heilmann et al. ............ 55/481 |
| 6,598,580 B1 | * | 7/2003 | Baumann et al. ....... 123/198 E |
| 6,623,350 B1 | * | 9/2003 | Goupil et al. ................. 55/481 |
| 6,780,217 B1 | * | 8/2004 | Palmer ........................ 55/481 |
| 2004/0261383 A1 | * | 12/2004 | Schaerlund et al. .......... 55/498 |

\* cited by examiner

*Primary Examiner*—Jason M. Greene
(74) *Attorney, Agent, or Firm*—Brinks Hofer Gilson & Lione

(57) ABSTRACT

An air cleaner for a vehicular engine includes a pre-filter which receives air flow containing particulates and a primary filter which receives the air from the pre-filter. The pre-filter removes a first proportion of particulates from the air, and the primary filter removes a second proportion of particulates from the air. The pre-filter is separately serviceable from the primary filter.

14 Claims, 4 Drawing Sheets

PRE-FILTERS FOR ENGINE AIR CLEANING SYSTEMS

BACKGROUND

The present invention relates generally to air cleaners for vehicles. More specifically, the present invention relates to pre-filters for engine air cleaning systems.

In certain engine applications for vehicles, pre-filters are used in conjunction with a primary filter to increase the filtration performance of the air cleaner as well as extend the life of the primary cleaner. The pre-filter removes coarser particles, for example, particles larger than 15 µm. Pre-filters may be used where large amounts of dusts or contaminants need to be removed, for example, in engine air cleaner systems for light/medium trucks, heavy vehicles, and off road type vehicles. In these applications, the pre-filter is incorporated with the primary filter as a single unit. Although the lifespan of the primary filter is significantly longer than that of the pre-filter, servicing the pre-filter requires servicing the primary filter as well. That is, when the pre-filter must be replaced, a user must gain access to both the primary filter and pre-filter, for example, by opening a cover in the air cleaner, and remove both filters, even when primary filter's lifespan has not been exceeded.

From the above, it is seen that there exists a need for an improved engine air cleaner system for vehicles in which the pre-filter can be serviced separately from the primary filter.

BRIEF SUMMARY

In overcoming the above mentioned and other drawbacks, the present invention provides a cost effective air cleaner system with a pre-filter and a primary air filter. The pre-filter is simple to use and cost effective to replace. The pre-filter can be replaced without disturbing and removing the primary filter. The pre-filter can be formed of a rigid or flexible material.

Embodiments of the air cleaner system may include one or more of the following features. The air cleaner system includes a tray in which the pre-filter is positioned. The pre-filter can be positioned a distance from the primary filter, adjacent to the primary filter, or at an angle relative to the primary cleaner. The pre-filter is inserted into and removed from the tray by sliding the pre-filter in and out of the tray.

In some implementations, the air cleaner system may include a tray, a manifold connected at a first end to the tray, and an intake housing connected to a second end of the manifold, with the pre-filter positioned in the intake housing. The pre-filter can be serviced by sliding it in and out of the intake housing.

Among other advantages, the pre-filter protects the primary (final) filter to optimize the performance of the primary filter and to extend the life of the primary filter. The pre-filters may be serviced as needed while leaving the primary filter in the housing. In some configurations, the pre-filter is serviced without opening the air cleaner. Thus the use of the pre-filter may reduce the occurrences of leakage, mis-assembly, mis-handling among other service issues. Moreover, the pre-filter is simple to fabricate and use, improves dust capacities of the air cleaners, improves overall efficiency of the filtration process, reduces system restriction rise (rate), reduces operational costs and is therefore cost effective.

Other features and advantages will become apparent from the following detailed discussion and from the claims.

BRIEF DESCRIPTION OF THE DRAWINGS

The accompanying drawings, incorporated in and forming a part of the specification, illustrate several aspects of the present invention and, together with the description, serve to explain the principles of the invention. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

Figure 1:
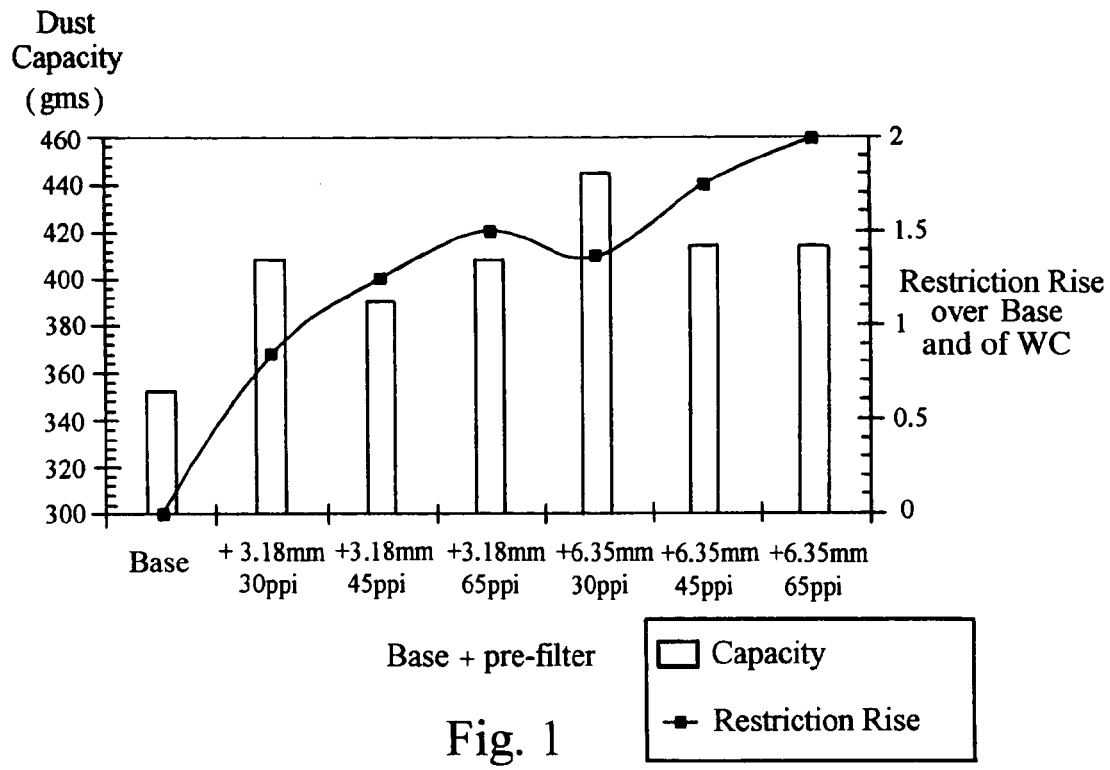
FIG. 1 is a graph illustrating the relative performance using a foam pre-filter on dust holding capacity.

FIG. 1 illustrates the performance characteristics of a base primary filter alone and the base cleaner with various pre-filters made from reticulated foam of different thickness (3.18 mm and 6.35 mm) and different pore densities (30, 45, or 65 pores per inch (ppi)). In this example, the base filter has a dust capacity of about 350 grams. Depending on the pre-filter thickness and pore density, the pre-filter significantly increases the capacity (390 grams to 450 grams). As expected, the pre-filter somewhat increases the restriction rise relative to the base filter from about 0.9 inch of water to 2 inches of water. A pre-filter with multiple layers of reticulated foam can be used to yield even higher dust capacities.

As shown, the capacity of the pre-filter and primary combination can be about 30% more than that of the primary filter alone with minimal increase in the restriction rise through the filters. In accordance with the invention, improved capacities greater than 50% can be achieved with the right combination of pre-filters and final filter. Note that also in accordance with the invention pre-filters with multiple layer media can yield dust capacities two to three times greater than that shown in FIG. 1.

Figure 2:
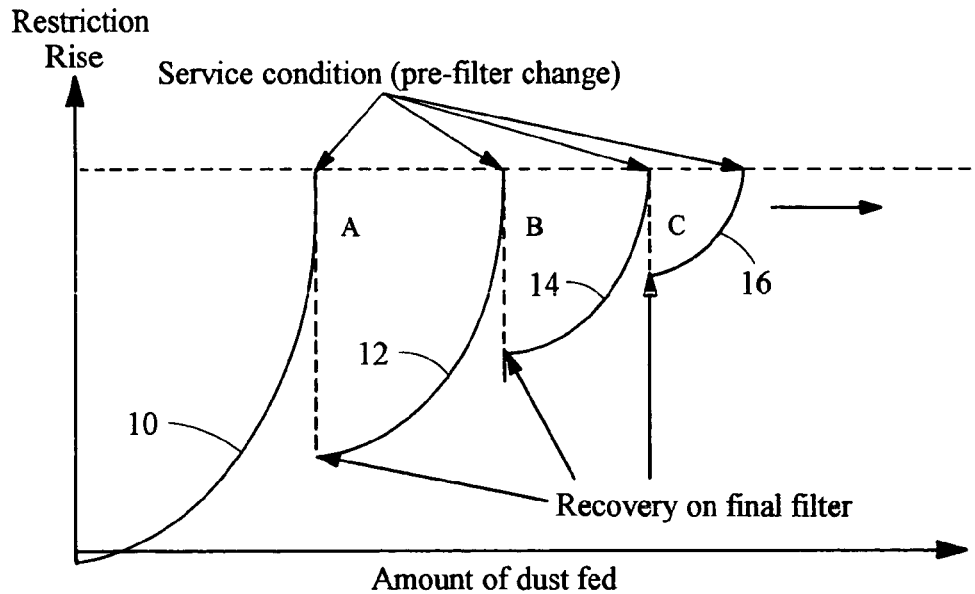
FIG. 2 is a graph illustrating the system response using a pre-filter.

Typically, the pre-filter captures the majority of the particulates, such as dust, and therefore protects the primary filter. FIG. 2 shows the restriction rise of a primary or final filter with four different replacement pre-filters identified by the reference numerals 10, 12, 14, and 16. If the dashed horizontal line represents the final saturated condition of the primary filter, it is easily seen that the pre-filter can be replaced at least four times before the primary filter must be replaced. Thus, the pre-filter can be serviced several times before the final filter needs to be serviced, thereby saving costs and improving system performance.

Figure 3:
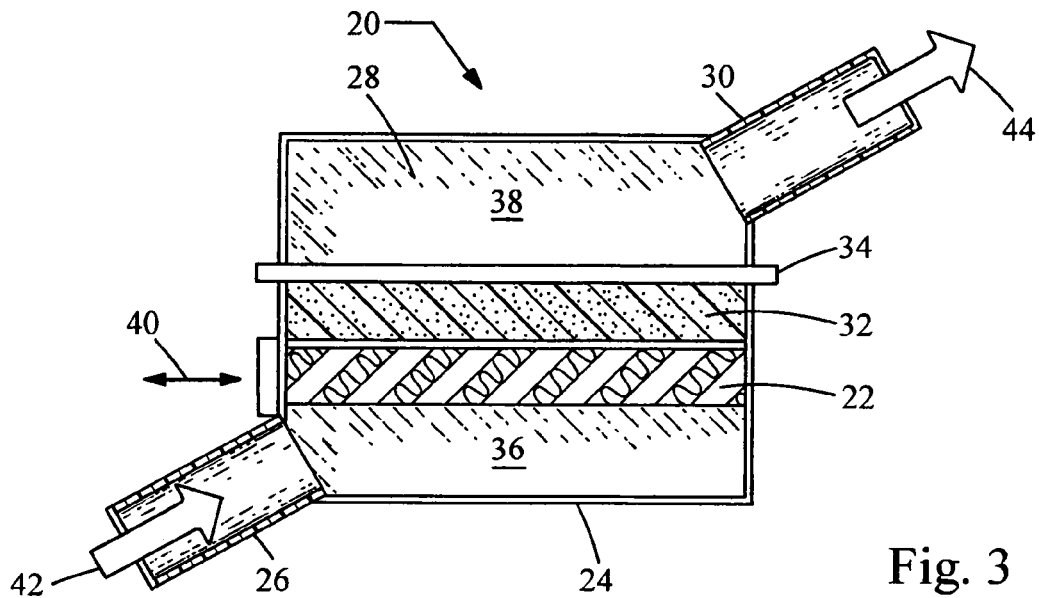
FIG. 3 is an interior view of an air cleaner with a cartridge slide-in pre-filter in accordance with the invention.

FIG. 3 illustrates an engine air cleaner 20 of an engine air cleaning system, such as an air induction system ("AIS"), with a slide-in pre-filter 22 in accordance with the invention.

The air cleaner 20 includes a tray 24 that communicates with an inlet 26 and a cover 28 that communicates with an outlet 30. In addition to the pre-filter 22, the tray 24 is provided with a primary filter 32 positioned adjacent to the pre-filter 22. The cover 28 is attached to the tray 24 with wire bail clamps or widow tab type clamps 34 or any other suitable clamping device to form a seal between the tray 24 and the cover 28. The primary filter 32 and the pre-filter 22 are located between the inlet 26 and the outlet 30, thereby defining an unfiltered zone 36 in the tray 24 and a post-filtered zone 38 in the cover 28.

The pre-filter 22 in this embodiment is a rigid cartridge that can slide in and out of the tray 24, as indicated by the double arrow 40. This feature allows a user to service the pre-filter 22 without opening the cover 28 and moreover without disturbing the primary filter 32.

The primary filter 32 can be a pleated media panel design, a multilayered reticulated foam filter, or a felt type filter. The pre-filter 22 can be referred to as a dual layer filter, multi-layer filter, conditioning filter, and extended surface filter. The pre-filter 22 may have a pleated configuration or may be formed from flat sheets of pads. Some embodiments of the pre-filter 32 are formed of fibrous-media (pleaded or flat sheets), glass, cellulose, synthetic material, wire meshes, screens, reticulated foam, porous plastics, aerodynamic media, or strainers, among other suitable materials. Typically, the pre-filter 22 has a higher permeability and coarser fibers than the primary filter. Moreover, the pre-filter 22 generally has a high loft, a high dust containment capability, a low flow restriction, and a high strength. Moreover, the pre-filter does not require sealing. That is, unlike the primary filter, the pre-filter does not require a seal, for example, around the periphery of the filter. The expandable nature of the pre-filter may provide a sufficient seal after the pre-filter is inserted into the tray.

When in use, air containing particulates enters the cleaner 20 through the inlet 26, as indicated by the arrow 42, and flows into the unfiltered zone 36. From there, the air flows through the pre-filter 22 and subsequently through the primary filter 32 into the post-filtered zone 38. The "filtered" air flows from the zone 38 out of the air cleaner 20 through the outlet 30, as indicated by the arrow 44, to the engine intake manifold.

Figure 4:
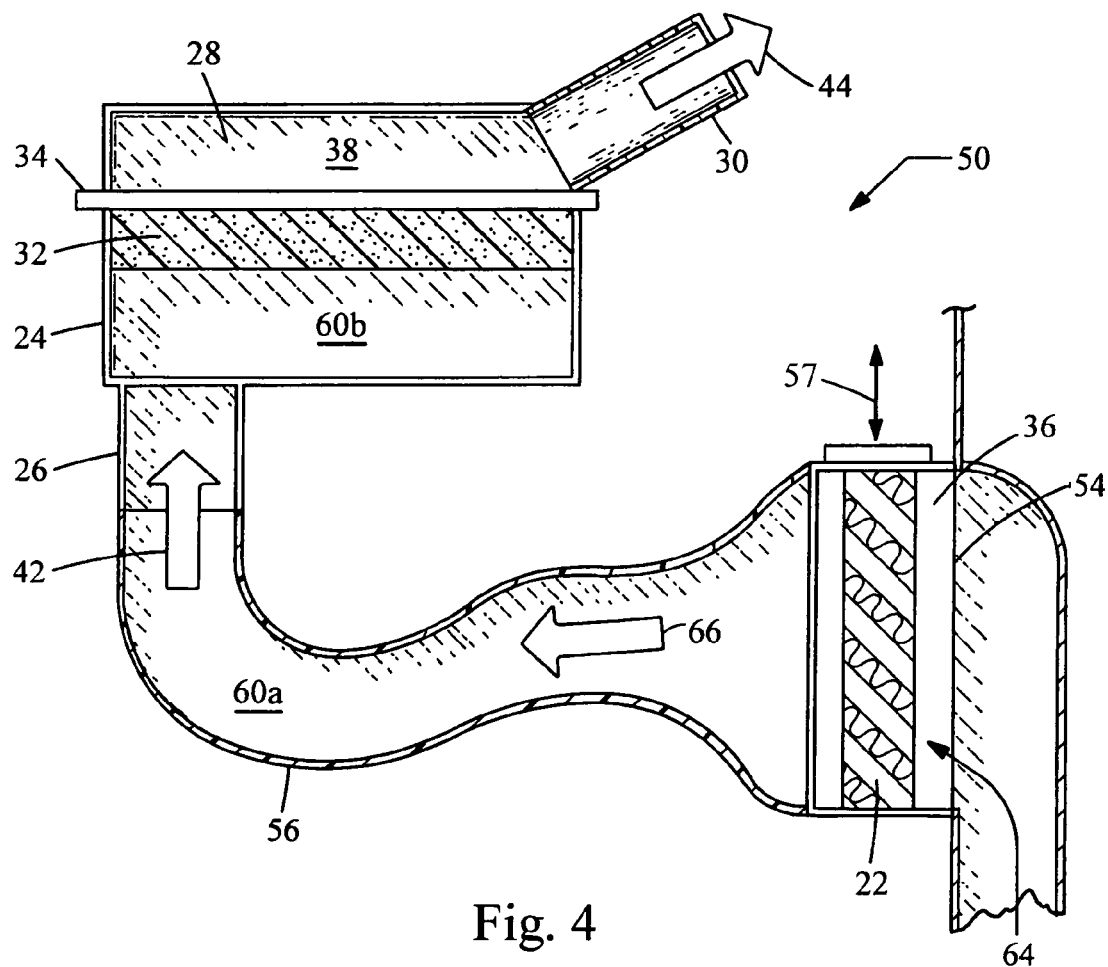
FIG. 4 is an interior view of an air cleaner system with a remote pre-filter mounted near a fender in accordance with the invention.

Another embodiment shown in FIG. 4 as an engine air cleaner 50 has the pre-filter 22 mounted near a fender positioned a distance away from the engine air cleaner, in particular the primary filter 32. A beneficial feature of this arrangement is that the mounting structure for the pre-filter 22 may also serve as a resonator for sound attenuation. The inlet 26 communicates to an intake housing 54 on the fender through a manifold 56. Again, the pre-filter 22 is a rigid or flexible slide-in cartridge. To service the pre-filter, a user slides it in and out of the intake housing 54, as indicated by the arrow 57.

The configuration of the pre-filter 22 relative to the primary filter 32 defines four zones: the unfiltered zone 36, an intermediate zone 60a in the manifold 56 and an intermediate zone 60b in the tray 24, and the post-filtered zone 38. Accordingly, air enters the air cleaning system 50 through the air intake housing 54, as indicated by the arrow 64. The air in the unfiltered zone 36 flows through the pre-filter 22, where the air is partially filtered, into the intermediate zone 60a of the manifold 56 and subsequently through the inlet 26 into the intermediate zone 60b of the tray 24, as indicated by the arrows 66 and 42. From the intermediate zone 60b, the partially filtered air flows through the primary filter 32, where the air is further filtered, into the post-filtered zone 38. The filtered air then flows from the air cleaning system 50 through the outlet 30, as indicated by the arrow 44, to the engine. Similar to the system 20 shown in FIG. 3, a user can service the pre-cleaner 22 shown in FIG. 4 without opening the cover 28 and without disturbing the primary filter 32 by sliding the pre-filter 22 in and out of the intake housing 54.

Figure 5:
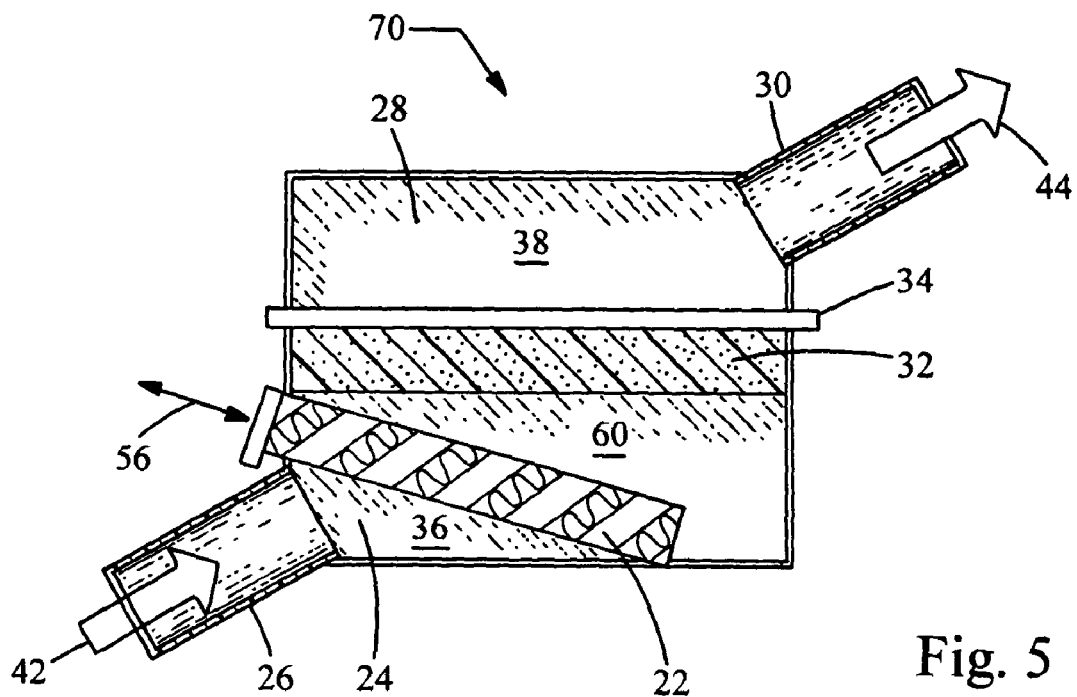
FIG. 5 is an interior view of an air cleaner system with an angled pre-filter cartridge in accordance with the invention.

FIG. 5 shows another air cleaner 70 incorporating a rigid slide-in pre-filter cartridge that is serviceable without opening the air cleaner and without disturbing the primary filter. In this implementation, the slide-in cartridge 22 is positioned at an angle in the tray 24 such that the unfiltered zone 36 is defined between the air inlet 26 and the bottom of the pre-filter 22. The intermediate zone 60 is located between the pre-filter 22 and the primary filter 32, while the post-filtered zone 38 is the same as that shown in FIGS. 3 and 4. With the slide-in cartridge 22 positioned at an angle as shown in FIG. 5, a user has easier access to the pre-filter 22.

Figure 6:
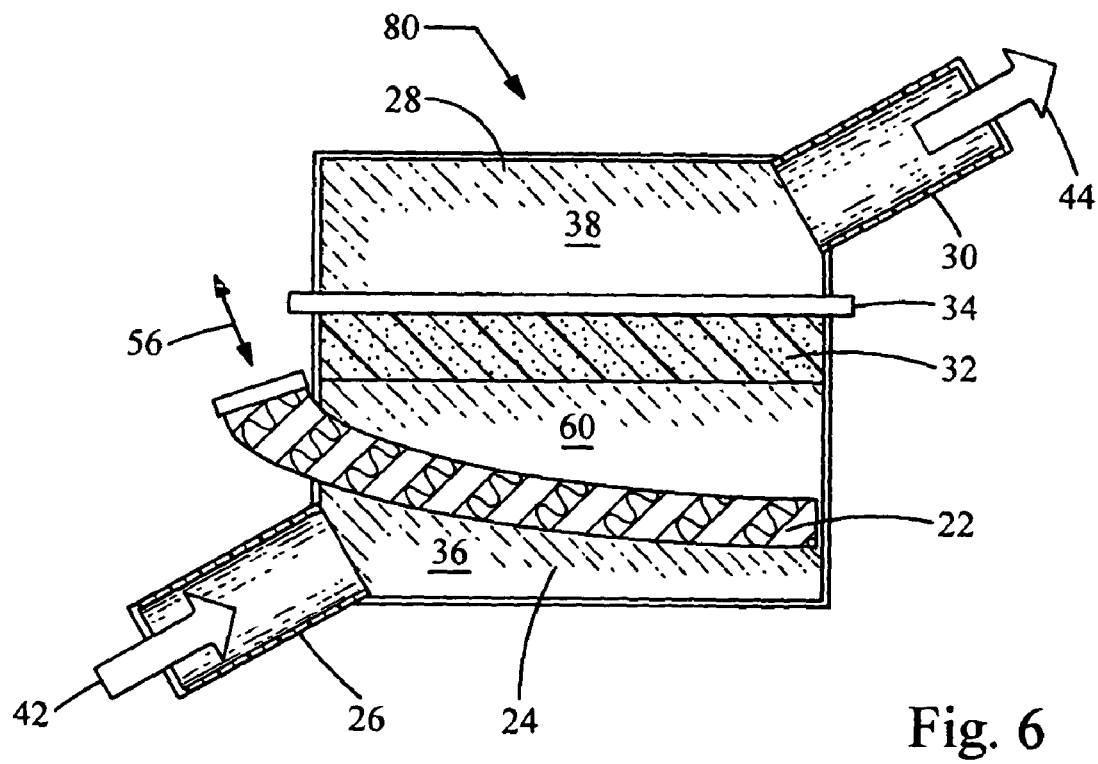
FIG. 6 is an interior view of an air cleaner system with a flexible pre-filter cartridge in accordance with the invention.

While the embodiment shown in FIG. 5 uses a rigid pre-filter 22, other types of pre-filters can be used, such as the flexible type filter 22 of the engine air cleaner 80 shown in FIG. 6.

Figure 7:
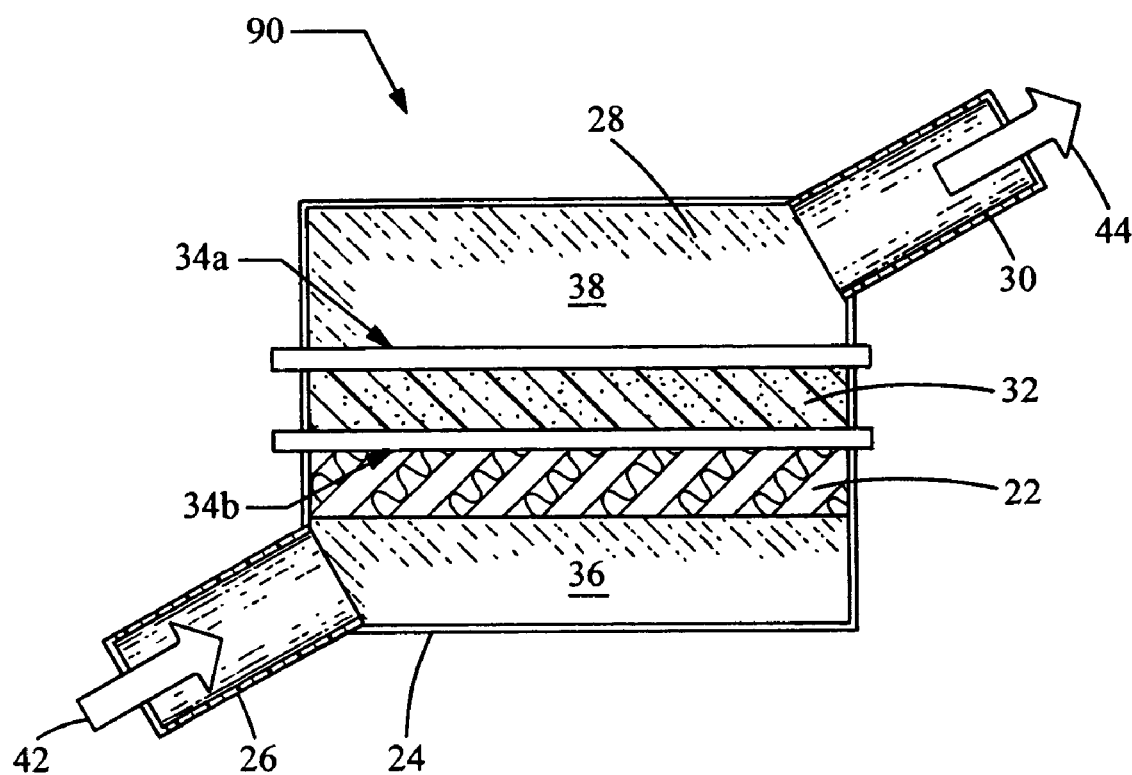
FIG. 7 is an interior view of an air cleaner system with a primary air filter incorporated with a pre-filter in accordance with the invention.

An alternative embodiment shown in FIG. 7 as an engine air cleaner 90 is a dual tray design that incorporates the primary filter 32 and the pre-filter 22. In this embodiment, the pre-filter 22 is mated to the primary filter 32 by a wire bail clamp, spring clamp, or window tab arrangement 34b to seal the juncture between the two filters 22 and 32. Note that the pre-filter 22 may not require an airtight seal if it does not affect the vehicle NVH. The cover 28 is in turn attached to the primary filter 32 with screw inserts or nuts 34a to form a seal between the cover 28 and the primary filter 32. Although the pre-filter 22 can be serviced separately in the engine air cleaner 90, typically, a user services both filters 22, 32 at the same time.

The pre-filter of the present invention can be positioned near the main or primary engine air cleaner or remotely mounted, for example, in a fender, away from the main air cleaner. In any case, the pre-filter is easily accessible and serviceable. The pre-filter can be a rigid cartridge or formed from a flexible material. The rigid cartridge may consist of a molded plastic frame with features that enables it to slide in and out of the air cleaner. A flexible felt frame may be used to encapsulate the pre-filter. The pre-filter may be a "black-box" design, incorporating the filter and frame that is replaced in its entirety when serviced.

In some implementations, the primary filter is designed for extended life of 60K to 90K miles, and the pre-filter is designed to be serviced every 15K to 30 k miles. Thus, the primary filter can be designed to be serviced once for every 3 to 5 pre-filter service changes. The pre-filter can be designed into any shape and size to meet packaging requirements. The pre-filter does not have to be sealed. The cost of a pre-filter is typically less than the cost of the primary filter. For example, the pre-filter may cost about one-third to one-half the cost of the primary filter.

It is therefore intended that the foregoing detailed description be regarded as illustrative rather than limiting, and that it be understood that it is the following claims, including all equivalents, that are intended to define the spirit and scope of this invention.

What is claimed is:

1. An air cleaner system for a vehicular engine, comprising:
   a pre-filter which receives air flow containing particulates, the pre-filter removing a first proportion of particulates from the air;

a tray in which the pre-filter is positioned, the pre-filter being inserted into and removed from the tray by sliding the pre-filter in and out of the tray; and a primary filter which receives the air flow from the pre-filter, the primary filter removing a second proportion of particulates from the air, and the air flowing from the primary filter to an air intake of the engine, the pre-filter being separately serviceable from the primary filter.

2. The air cleaner system of claim 1 wherein the pre-filter is positioned adjacent to the primary filter.

3. The air cleaner system of claim 2 wherein the pre-filter is formed of a rigid material.

4. The air cleaner system of claim 2 wherein the pre-filter is formed of a flexible material.

5. The air cleaner system of claim 1 wherein the pre-filter is positioned at an angle relative to the primary filter.

6. The air cleaner system of claim 5 wherein the pre-filter is formed of a rigid material.

7. The air cleaner system of claim 5 wherein the pre-filter is formed of a flexible material.

8. The air cleaner system of claim 1 further comprising a manifold connected at a first end to the tray and an intake housing connected to a second end of the manifold, the pre-filter being positioned in the intake housing.

9. The air cleaner system of claim 8 wherein the pre-filter is inserted into and removed from the intake housing by sliding the pre-filter in and out of the intake housing.

10. The air cleaner system of claim 9 wherein the pre-filter is formed of a rigid material.

11. The air cleaner system of claim 9 wherein the pre-filter is formed of a flexible material.

12. The air cleaner system of claim 1 wherein the pre-filter is formed of reticulated foam.

13. The air cleaner system of claim 1 wherein the pre-filter is formed of felt.

14. The air cleaner system of claim 1 wherein the first proportion of particulates is between about 50% and 80% of the particulates by mass.

* * * * *